United States Patent Office  3,513,210
Patented May 19, 1970

3,513,210
HYDROGENATION OF CYCLODODECATRIENE
Lawrence Wayne Gosser, Wilmington, Del., assignor to E. I. du Pont de Nemours and Company, Wilmington, Del., a corporation of Delaware
No Drawing. Filed Feb. 24, 1969, Ser. No. 801,841
Int. Cl. C07c 5/16
U.S. Cl. 260—666                        10 Claims

ABSTRACT OF THE DISCLOSURE 1,5,9-cyclododecatriene can be selectively hydrogenated to cyclododecene by the action of hydrogen in the presence of a homogeneous catalyst of iridium trichloride, preferably in the presence of 1 to 5 parts of stannous chloride per part of iridium trichloride, and in the presence of an inert polar organic solvent.

BACKGROUND OF THE INVENTION

This invention relates to a method of making cyclododecene by the hydrogenation of 1,5,9-cyclododecatriene.

1,5,9-cyclododecatriene containing isolated double bonds can be made by the trimerization of butadiene [G. Wilke and M. Kröner, Angew. Chem., 71, 574 (1959); H. Tokahasi and M. Yamaguchi, J. Org. Chem., 28, 1409 (1963)]. The process of the present invention provides a method for partially hydrogenating 1,5,9-cyclododecatriene to cyclododecene, which can be oxidized to dodecanedioic acid [Can. Pat. 775,593, U.S. 3,383,398, and Br. Pat. 965,510]. Dodecanedioic acid is a valuable chemical useful for the production of polyamide and polyester resins, surface active agents and the like.

SUMMARY OF THE INVENTION

The process of the present invention can be defined as reacting 1,5,9-cyclododecatriene with hydrogen in the presence of a catalytic amount of iridium trichloride, $IrCl_3$, preferably also in the presence of from 1 to 5 parts by weight of $SnCl_2 \cdot 2H_2O$ per part of $IrCl_3$, and in the presence of an inert organic solvent, at a temperature of 25 to 150° C. and preferably 75 to 125° C. and recovering cyclododecene from the reaction product.

DETAILED DESCRIPTION OF THE INVENTION

The process of the present invention is a homogeneous catalytic hydrogenation process employing an iridium trichloride catalyst. Some inert polar organic solvent is highly desirable to assist the progress of the reaction, but this need not be present in an amount of more than 5% to 10% by weight of the 1,5,9-cyclododecatriene. Preferably the solvent will be present in an amount sufficient to form a solution containing from 1% to 95% by weight of 1,5,9-cyclododecatriene.

Suitable solvents include the aliphatic, lower molecular weight saturated alcohols, alcohol-ethers, cyclic ethers, polyoxa - ethers, N,N - dialkylamides and ketones which are liquid under the conditions of the reaction; including methanol, ethanol, propanol, isopropanol, butanol, hexanol, 2 - loweralkoxyethanol, and cyclohexanol; the lower alkyl ethers of ethylene glycol and lower polyethylene glycols, such as glycol dimethyl ether and diethyleneglycol dimethyl ether; tetrahydrofuran, dioxane, trioxane, dimethylformamide, acetone, methyl ethyl ketone, methyl isobutyl ketone and the like. In general it is preferred that the solvent have from 1 to 10 carbon atoms, but it will be realized that other alcohols and ethers can be employed.

The preferred catalysts are those in which tin chloride is present in addition to iridium trichloride. The tin chloride assists in forming a homogeneous solution of the iridium trichloride and in general the catalyst obtained is highly selective. The tin chloride is generally employed in the form of the hydrate $SnCl_2 \cdot 2H_2O$, which is readily available. Generally, the weight ratio of $SnCl_2 \cdot 2H_2O / IrCl_3$ should be from about 1 to about 5. Larger amounts decrease the rate of hydrogenation, while smaller amounts are ineffective in suppressing the formation of insoluble materials during the reaction.

The catalyst should be used in an amount effective to catalyze the reaction. Loadings as low as 0.001 gm. $IrCl_3$/ml. of 1,5,9-cyclododecatriene are effective, but generally concentrations of about 0.01 to 0.1 gm. $IrCl_3$/ml. of 1,5,9-cyclododecatriene are preferred to obtain the best selectivity.

In general, the concentration of catalyst/ml. of solution should likewise not be less than 0.001 gm. $IrCl_3$/ml. of solution, and preferably should be from 0.005 to 0.5 gm. of $IrCl_3$/ml. of solution.

With respect to the temperature, the best results are obtained in the vicinity of 100° C. and accordingly the preferred range of temperature is from 75° C. to 125° C. Satisfactory results can be attained in the range from about 25° C. to 150° C. At higher temperatures by products are increased, while at lower temperatures than the optimum the selectivity of the catalyst is decreased.

Pressure is not highly critical. Atmospheric pressure can be employed or pressure of 10,000 p.s.i. or higher. Preferred conditions are from 20 p.s.i.g. to 100 p.s.i.g.

The vessel in which the reaction is conducted is not critical so long as the materials of which the vessel is made are chemically inert. Excellent results are obtained with glass vessels; or if higher pressures are used than can be obtained with all-glass equipment, glass-lined vessels can be used. Other materials can be used, such as Hastelloy-C or other chemically inert materials commonly used to fabricate industrial chemical equipment.

This invention is further illustrated by the following examples which are not, however, intended to fully delineate the scope of this discovery.

EXAMPLES 1–24

In these examples, the conditions and the results obtained in hydrogenating samples of 1,5,9-cyclododecatriene are given in the table. Two techniques were employed in these runs as indicated in the table.

(A) Reaction using a glass pressure vessel

The iridium chloride and stannous chloride were placed in a 350 ml. pressure bottle of Pyrex® with a magnetic stirring bar. The entire apparatus was evacuated to less than 1 mm. Hg. Hydrogen was then admitted to 30 to 55 p.s.i.g. to check for leaks. The hydrogen was then vented to 0 p.s.i.g. and the cyclododecatriene and solvent were added by injection through a silicone rubber septum. Hydrogen was admitted and the mixture was stirred magnetically until the desired amount of hydrogen was consumed. The times, temperatures, and approximate pressures are given in the table.

(B) Reaction using a vessel lined with Hastelloy-C

The iridium chloride and stannous chloride were placed in the metal reaction vessel along with the cyclododecatriene and solvent The closed vessel was then cooled in a Dry Ice bath and evacuated to less than 1 mm. Hg. Hydrogen was then admitted to an appropriate pressure. The temperature and pressure were adjusted as indicated in the table and the vessel was shaken for the specified time.

Product recovery and analysis

With the exception of Example 22, the reaction mixture was combined with a benzene or methanol rinse of the reaction vessel. The solvents were removed with a rotary evaporator at pressures above 30 mm. Hg. The combined products were then separated from nonvolatile residues by flash distillation from a distillation pot at 120° C. and 0.1 to 1 mm. Hg pressure. The composition was then determined by VPC using a butanediol succinate column. The qualitative validity of these determinations was established by the use of NMR, infrared and refractive index measurements.

In the case of Example 22 using dimethyl formamide as a solvent, the product was added to about 75 ml. of pentane. The resulting mixture was extracted successively with three 200 ml. portions of water, the organic layer was dried over $MgSO_4$ and the dried organic solution was then subjected to the recovery and analytical procedures described above for the other examples.

2. Method of claim 1 in which the inert solvent is a saturated aliphatic compound having from 1 to 10 carbon atoms selected from alcohols and ether-alcohols, cyclic ethers, polyoxa-ethers, N,N-dialkylamides and ketones.

3. Method of claim 2 in which the iridium trichloride is present in an amount of from 0.01 to 0.1 gram/ml. of 1,5,9-cyclododecatriene.

4. Method of claim 3 in which the temperature is from 75° C. to 125° C.

5. Method of claim 4 in which the pressure is from 20 p.s.i.g. to 100 p.s.i.g.

6. Method of claim 1 in which the catalyst additionally comprises from 1 to 5 parts of $SnCl_2 \cdot 2H_2O$ per part of iridium trichloride.

7. Method of claim 6 in which the inert solvent is a saturated aliphatic compound having from 1 to 10 carbon atoms selected from alcohols and ether-alcohols, cyclic ethers, polyoxa-ethers, N,N-dialkylamides and ketones.

8. Method of claim 7 in which the iridium trichloride is present in an amount of from 0.01 to 0.1 gram/ml. of 1,5,9-cyclododecatriene.

9. Method of claim 8 in which the temperature is from 75° C. to 125° C.

TABLE—IRIDIUM CHLORIDE CATALYZED HYDROGENATION OF 1, 5, 9-CYCLODODECATRIENE

| Examples | $IrCl_3$, grams | $SnCl_2 \cdot 2H_2O$, grams | CDDT,[1] milliliters | Solvent | Milliliters | Time, hour | Temp., °C. | $H_2$ pressure, p.s.i.g. | Product, grams | $n_d$/° C. |
|---|---|---|---|---|---|---|---|---|---|---|
| 1 | 0.30 | 0.68 | 6.1 | $C_2H_5OH$ | 25 | 1.7 | 100 | 25 | 4.3 | 1.4845/25 |
| 2 | 0.30 | 0.68 | 6.1 | $C_2H_5OH$ | 25 | 1.3 | 100 | 25 | 4.6 | 1.4831/26 |
| 3 | 0.30 | 0.68 | 6 | $C_2H_5OH$ | 25 | 0.5 | 100 | 30-50 | 4.2 | 1.4852/25 |
| 4 | 0.30 | 0 | 6 | $C_2H_5OH$ | 25 | 1.7 | 100 | 30 | 5.3 | 1.4810/26 |
| 5 | 0.30 | 0 | 6 | $C_2H_5OH$ | 25 | 0.5 | 100 | 50 | 4.3 | 1.4800/25 |
| 6 | 0.30 | 0 | 6 | $C_2H_5OH$ | 25 | 1.3 | 90-95 | 25 | 4.6 | 1.4840/25 |
| 7 | 0.30 | 1.5 | 6 | $C_2H_5OH$ | 25 | 6 | 100 | 50 | 3.6 | 1.4952/25 |
| 8 | 0.30 | 1.5 | 6 | $C_2H_5OH$ | 25 | 6 | 125 | 130 | 3.9 | 1.4976/25 |
| 9 | 0.30 | 1.5 | 6 | $C_2H_5OH$ | 25 | 6 | 125 | 1,300 | 4.6 | 1.4912/25 |
| 10 | 0.30 | 0.68 | 6 | $C_2H_5OH$ | 25 | 12 | 26-32 | 9,800 | 4.5 | 1.4968/25 |
| 11 | 0.30 | 0.68 | 6 | $C_2H_5OH$ | 25 | 16 | 51-55 | 19-40 | 4.8 | 1.4892/25 |
| 12 | 0.30 | 0.68 | 6 | $CH_3OH$ | 25 | 0.5 | 100 | 34-50 | 5.0 | 1.4875/25 |
| 13 | 0.30 | 0.68 | 6 | n-$C_4H_9OH$ | 25 | 1 | 100 | 21-45 | 5.2 | 1.4841/25 |
| 14 | 0.30 | 0.68 | 6 | n-$C_3H_7OH$ | 25 | 1.5 | 98-102 | 20-40 | 4.7 | 1.4870/25 |
| 15 | 0.30 | 0.68 | 24 | n-$C_3H_7OH$ | 7 | 6 | 100 | 50-100 | 18.8 | 1.4801/25 |
| 16 | 0.30 | 0.68 | 29 | n-$C_3H_7OH$ | 2 | 6 | 125 | 50-100 | 22.7 | 1.4972/25 |
| 17 | 0.030 | 0.068 | 6 | $C_2H_5OH$ | 25 | 12 | 125 | 50 | 5.0 | 1.4920/25 |
| 18 | 0.30 | 0.68 | 29 | $C_2H_5OH$ | 2 | 6 | 125 | 2,100 | 24.3 | 1.4929/25 |
| 19 | 0.030 | 0.068 | 24 | $C_2H_5OH$ | 6 | 6 | 100 | 2,000 | 20.3 | 1.4941/25 |
| 20 | 0.030 | 0.068 | 6 | $C_2H_5OH$ | 2 | 21 | 125 | 50 | 4.7 | 1.4921/26 |
| 21 | 0.30 | 0.68 | 6 | $C_2H_5OH$ | 25 | 1.7 | 75 | 40 | 4.9 | 1.4852/26 |
| 22 | 0.30 | 0.68 | 6 | DMF[3] | 20 | 1 | 100 | 40 | 3.4 | 1.4880/27 |
| 23 | 0.30 | 0.68 | 6 | THF[4] | 25 | 6 | 100 | 50 | 4.8 | 1.4860/25 |
| 24 | 0.30 | 0.68 | 6 | $CH_3COCH_3$ | 20 | 2.5 | 100 | 40 | 4.9 | 1.4912/27 |

| Examples | NMR integration ratio olefin H/sat'd H | Percent cyclododecane | VPC analysis Cyclododecenes Percent | Cyclododecenes trans/cis | TTT-CDDT[2] +dienes, percent | CDDT,[1] percent | Unknown, percent | Reaction vessel |
|---|---|---|---|---|---|---|---|---|
| 1 | 0.103 | 0.4 | 97.5 | | 1.6 | | 0.5 | Glass. |
| 2 | 0.092 | 1 | 98 | | 1 | | | Do. |
| 3 | 0.133 | 6.5 | 81.4 | 1.18 | 10.4 | 1.6 | | Hastelloy-C. |
| 4 | 0.097 | 12.6 | 87.4 | 1.82 | | | | Glass. |
| 5 | 0.0695 | 20.8 | 79.2 | 1.79 | | | | Hastelloy-C. |
| 6 | 0.118 | | 95.3 | 1.52 | 3.9 | 0.7 | | Glass. |
| 7 | 0.276 | 0.7 | 31.4 | 0.517 | 53.5 | 14.1 | | Hastelloy-C. |
| 8 | 0.275 | | 25.5 | 0.275 | 54.6 | 20 | | Do. |
| 9 | 0.225 | 7.6 | 44.8 | 0.710 | 33.9 | 13.8 | | Do. |
| 10 | 0.272 | 3.3 | 22.6 | 0.30 | 40.4 | 33.8 | | Do. |
| 11 | 0.184 | 3.7 | 69.1 | 0.705 | 23.1 | 4.1 | | Glass. |
| 12 | 0.156 | 1.5 | 79.4 | 1.02 | 14.6 | 4.4 | | Hastelloy-C. |
| 13 | 0.136 | 1.8 | 85.4 | 1.27 | 10.7 | 2.1 | | Glass. |
| 14 | 0.123 | 2.4 | 81.0 | 0.98 | 13.4 | 3.1 | | Do. |
| 15 | 0.076 | 19.9 | 79.0 | 1.98 | 0.9 | | | Hastelloy-C. |
| 16 | 0.246 | 3.0 | 32.5 | 0.295 | 42.6 | 19.0 | 2.9 | Do. |
| 17 | 0.233 | 2.6 | 56.7 | 0.47 | 35.1 | 2.9 | 2.8 | Glass. |
| 18 | 0.257 | 2.0 | 49.7 | 0.52 | 37.8 | 15.1 | 5.2 | Hastelloy-C. |
| 19 | 0.260 | 2.5 | 32.8 | 0.54 | 44.8 | 18.6 | 1.2 | Do. |
| 20 | 0.247 | 5.2 | 42.9 | 0.45 | 42 | 7.7 | 2.1 | Glass. |
| 21 | 0.128 | 6.2 | 79.8 | 1.23 | 11.7 | 0.9 | 1.7 | Do. |
| 22 | 0.172 | 1.2 | 69.4 | 0.92 | 23.5 | 2.1 | 3.6 | Do. |
| 23 | 0.142 | 5.7 | 81.2 | 1.20 | 10.3 | 1.1 | 1.7 | Hastelloy-C. |
| 24 | 0.232 | 0.3 | 55.6 | 0.45 | 36.4 | 2.9 | 4.9 | Glass. |

[1] CDDT=trans,trans,cis-1, 5, 9-cyclododecatriene.
[2] TTT-CDDT=trans,trans,trans-1,5,9-cyclododecatriene.
[3] DMF=dimethylformamide.
[4] THF=tetrahydrofuran.

The embodiments of the invention in which an exclusive property or privilege is claimed are defined as follows:

1. Method which comprises reacting 1,5,9-cyclododecatriene with hydrogen in the presence of a catalytic amount of iridium trichloride and an inert polar organic solvent at a temperature of 25° C. to 150° C. and recovering cyclododecene from the reaction product.

10. Method of claim 9 in which the pressure is from 20 p.s.i.g. to 100 p.s.i.g.

References Cited

UNITED STATES PATENTS

| | | |
|---|---|---|
| 3,360,577 | 12/1967 | Pickles. |
| 3,408,415 | 10/1968 | Dovell. |
| 3,251,892 | 5/1966 | Scofelder. |
| 3,458,547 | 7/1969 | Coffey. |
| 3,369,052 | 2/1968 | Howell. |
| 2,360,555 | 10/1944 | Evans. |
| 3,022,359 | 2/1962 | Wiese. |
| 3,316,319 | 4/1967 | Armstrong. |

DELBERT E. GANTZ, Primary Examiner

V. O'KEEFE, Assistant Examiner